United States Patent [19]
Tuckey

[11] Patent Number: 5,265,644
[45] Date of Patent: Nov. 30, 1993

[54] FUEL PRESSURE REGULATOR

[75] Inventor: Charles H. Tuckey, Cass City, Mich.

[73] Assignee: Walbro Corporation, Cass City, Mich.

[21] Appl. No.: 37,031

[22] Filed: Mar. 25, 1993

Related U.S. Application Data

[63] Continuation-in-part of Ser. No. 892,252, Jun. 2, 1992, Pat. No. 5,220,941, and a continuation-in-part of Ser. No. 949,974, Sep. 24, 1992.

[51] Int. Cl.⁵ .......................................... G05D 16/20
[52] U.S. Cl. .................................. 137/510; 123/463; 123/497; 137/554; 137/557
[58] Field of Search .............. 137/510, 554, 557; 251/86; 123/497, 463

[56] References Cited

U.S. PATENT DOCUMENTS

| | | | |
|---|---|---|---|
| 4,248,194 | 2/1981 | Drutchas et al. | 123/497 X |
| 4,627,463 | 12/1986 | Johnstone | 137/510 |
| 4,712,528 | 12/1987 | Schaffitz | 123/497 X |
| 4,756,291 | 7/1988 | Cummins et al. | 123/497 |
| 4,800,859 | 1/1989 | Sagisaki et al. | 123/463 |
| 4,920,942 | 5/1990 | Fujimori et al. | 123/497 |
| 4,951,636 | 8/1990 | Tuckey et al. | 123/497 |
| 5,133,323 | 7/1992 | Treusch | 123/463 X |
| 5,148,792 | 9/1992 | Tuckey | 123/497 |

*Primary Examiner*—Stephen M. Hepperle
*Attorney, Agent, or Firm*—Barnes, Kisselle, Raisch, Choate, Whittemore & Hulbert

[57] ABSTRACT

A fuel pressure regulator with a flexible diaphragm defining in part first and second chambers in a housing and moving a ball valve in the first chamber to open and closed positions to regulate pressure of fuel discharged from the first chamber through an outlet having a seat on which the ball is received when the valve is closed. A cage carried by the diaphragm cooperates with a carrier member or disc fixed to the ball to provide a lost motion coupling between the diaphragm and the ball valve. This coupling permits movement within predetermined limits of the diaphragm generally axially, radially and pivotally relative to the ball while it remains on its seat and upon further generally axial movement of the diaphragm opens and partially closes the ball valve to regulate and maintain substantially constant the pressure of fuel discharged from the chamber over substantially the full range of the rate at which the fuel is discharged. Preferably, to further improve regulation, a restricted orifice is disposed in the outlet downstream of the valve seat.

24 Claims, 3 Drawing Sheets

FUEL PRESSURE REGULATOR

REFERENCE TO CO-PENDING APPLICATION

This is a continuation-in-part application of Ser. No. 07/892,252 filed Jun. 2, 1992 now U.S. Pat. No. 5,220,941, and a continuation-in-part of application Ser. No. 07/949,974 filed Sep. 24, 1992.

FIELD OF THE INVENTION

This invention relates to pressure regulators and more particularly to a pressure regulator for liquid fuel for an internal combustion engine.

BACKGROUND OF THE INVENTION

In many engines with fuel injection systems, it is desirable to supply liquid fuel to the injector or injectors at a pressure which varies so that it is constant relative to the intake manifold pressure of the combustion air. Both the combustion air pressure and the flow rate of fuel supplied to the engine varies with engine speed, load and other operating conditions.

Previously, a variety of fuel pressure regulators have been developed one of which is shown in U.S. Pat. No. 4,627,463. This regulator has a generally flat, flexible diaphragm disposed between two chambers and subjected to manifold pressure on one side and pressurized liquid fuel on the other side. The flow of fuel through an outlet from the fuel chamber is controlled by a valve assembly having a ball trapped in a cage carried by the diaphragm and yieldably urged by a compression spring received in the manifold pressure chamber into engagement with a seat encircling the outlet. The ball is retained in the cage so that it can shift slightly only laterally in a plane parallel to the diaphragm.

In use, these regulators do not achieve or maintain a uniform and constant differential fuel pressure. Rather, the differential fuel pressure varies with the rate of fuel flow and drops as fuel consumption increases. Furthermore, these prior devices have a significant delay in their response to rapid changes in intake manifold pressure and flow rate produced by rapid changes in engine load, demand or other operating conditions. At best, transient variations of the nominal output pressure of these prior regulators have been about three to four psi.

SUMMARY OF THE INVENTION

A regulator providing substantially constant fuel pressure throughout its normal operating range with its control valve having a lost motion coupling with the diaphragm so that the diaphragm can shift within predetermined limits axially, laterally or radially and pivotally with respect to the valve ball while it remains on its valve seat. Preferably, to improve the responsiveness of the regulator, the outlet through which the fuel flows around the ball, has a restricted orifice configured to produce a force on the ball as the rate of flow increases which tends to offset the increase in force on the ball produced by the spring biasing the diaphragm as the valve opens.

Preferably, to provide an improved system for controlling the cycling of a fuel pump, a pulse width modulated (PWM) control circuit includes a switch actuated by opening and closing of the valve in the pressure regulator to control the output of the pump supplying fuel to the regulator.

Objects, features and advantages of this invention include providing a diaphragm fuel pressure regulator which has improved regulation of the output pressure, a substantially constant differential output pressure over its normal operating range of variations in flow rate, substantially improved responsiveness to changes in the output flow rate and variation in fluid pressure applied to the non-fuel side of the diaphragm, and is of simplified design, economical manufacture and assembly, has a long in-service useful life, and requires no service or maintenance.

BRIEF DESCRIPTION OF THE DRAWINGS

These and other objects, features and advantages of this invention will be apparent from the following detailed description, appended claims and accompanying drawing in which:

DETAILED DESCRIPTION

Figure 1:
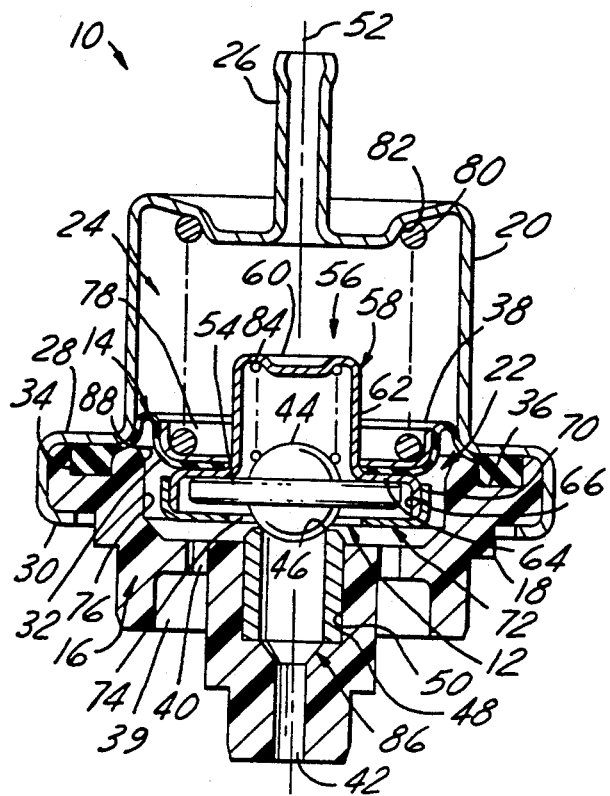
FIG. 1 is a sectional view of a fuel pressure regulator embodying this invention with the ball of its control valve shown in its seated or fully closed position.
Figure 1A:
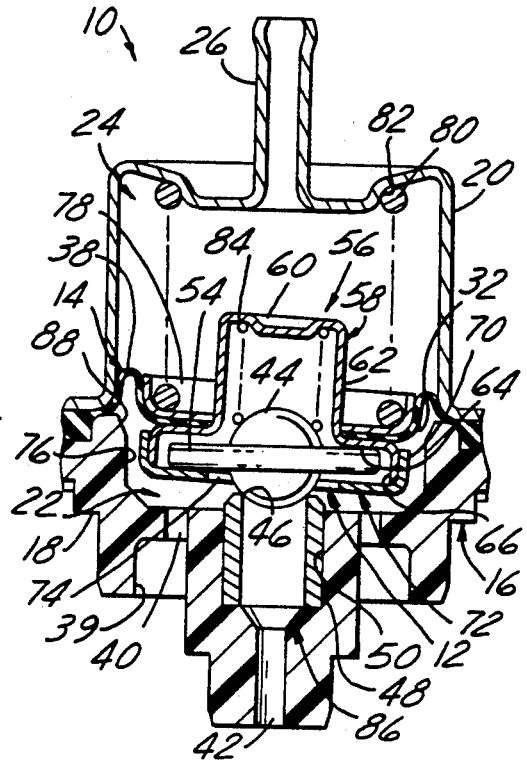
FIG. 1A is a sectional view of the pressure regulator of FIG. 1 with its diaphragm shown in a skewed or pivotal position relative to the longitudinal axis of the regulator and its position illustrated in FIG. 1.

Referring in more detail to the drawings, FIGS. 1 and 1A illustrate a fuel regulator 10 embodying this invention having a valve assembly 12 actuated by a diaphragm 14 and both received in a housing 16 defined by a body 18 and a cap 20. The diaphragm and housing define a liquid fuel first chamber 22 on one side of the diaphragm and a fluid second chamber 24 on the other side of the diaphragm. The cap has a passage or tube 26 communicating with the fluid chamber and is secured by a flange 28 with a return bend 30 rolled around the body 18 during assembly of the components.

The diaphragm 14 has a relatively thin and flexible central portion 32 and a circumferentially continuous peripheral rib 34 received in a groove 36 in the body and retained therein by the cap to provide a fluid tight seal between them and the diaphragm. Preferably, to provide a more flexible and responsive diaphragm, it has a circumferentially continuous pleat or bellows 38 therein which also readily accommodates substantial axial, radial, and pivotal displacement or movement of the diaphragm. Preferably, the diaphragm is made of a flexible elastomer such as a fluorosilicone rubber or preferably an acronytrile butadiene rubber and may be reinforced with a fabric embedded in the elastomer.

Liquid fuel is admitted to the chamber 22 through an annular recess 39 and circumferentially spaced inlet ports 40 in the body. When the valve assembly 12 opens, liquid fuel is discharged from the chamber through an outlet passage 42 in the body. The valve assembly 12 has a spherical check ball 44 which bears on a spherical seat 46 in a sleeve 48 received or pressed into a counterbore 50 in the outlet passage 42 to prevent the discharge of fuel while the valve assembly is closed.

As illustrated by comparison of FIGS. 1 and 1A, it has been discovered that when pressurized fuel in the chamber moves the diaphragm 14, its movement is inconsistent and varies from one time to the next and in mass produced regulators from one regulator to the next. The motion of the diaphragm varies axially and laterally, radially or in a plane generally perpendicular to the longitudinal axis 52 of the regulator. The motion also varies the angle of orientation by tilting, skewing, rocking or wobbling the diaphragm so that the plane of the diaphragm is not perpendicular to the longitudinal axis. In prior art regulators, this inconsistent movement of the diaphragm adversely affected the performance of the regulator by producing variations in the lift-off and seating of the ball or other valve closure member which contributed to variations in the output pressure as the quantity of fuel flowing through the chamber varies.

In accordance with this invention, these problems are obviated by a lost motion coupling of the diaphragm with the ball which permits the diaphragm to move axially, radially, and pivotally relative to the ball and to rotate the ball on its valve seat wherever necessary before being lifted off the seat by the diaphragm to open the valve assembly. This coupling is accomplished by the cooperation of a central flange or disc 54 loosely received in a cage 56. The disc 54 is fixed to the ball 44 and the cage 56 is attached to the diaphragm for movement therewith. Preferably, the disc has a slightly undersized central hole and is press fit onto the ball so they move together in unison. The cage has a hat-shaped housing 58 with a crown having a top 60 and a cylindrical side wall 62 and a circumferentially continuous brim or flange 64 with a downturned edge 66 over which an upturned edge 70 of a retainer ring 72 is press fit to loosely entrap the disc in the cage.

The retainer ring 72 has a clearance hole 74 large enough so that the ball will not bear on the ring when the cage shifts off center relative to the seated ball sufficiently so that the cage bears on the side wall 76 of the chamber 22. Preferably, the inside diameter of the brim edge 66 of the cage is sufficiently greater than the outside diameter of the disc 54 so that when the cage is shifted radially sufficiently off-center relative to the seated ball, the cage will strike the wall 76 of the chamber without contacting the periphery of the disc which would displace the ball from its seat.

Preferably, the longitudinal or axial distance between the inner faces of the brim of the cage 56 is sufficiently greater than the thickness of the disc 54 so that, as shown in FIG. 1A, a skewing, rocking, pivotal or orbital motion of the diaphragm and cage will not displace the ball 44 when received on its valve seat 46 and at most will contact opposite sides of the disc 54 in generally diametrically opposed locations and rotate the ball while it remains on the valve seat so that the disc is parallel to the brim of the cage.

The crown 62 of the cage projects through a central hole in the diaphragm which is secured and sealed to the cage by a retainer ring 78 with an upturned edge and a central hole which in assembly is press fit over the crown and bears on the diaphragm to seal it to the brim flange 64. The diaphragm and cage are yieldably biased toward the valve seat 46 by a compression spring 80 disposed in the chamber 24 and bearing on the retainer ring and cap. The spring is retained generally in co-axial alignment with the longitudinal axis 52 by an annular shoulder 82 in the cap on which it seats and the cage is generally co-axially aligned with the spring by the upturned edge of the retainer ring 78.

In accordance with another feature of this invention, the ball 44 and disc are yieldably biased toward the open end of the cage by a separate relatively small and light weight compression spring 84 received between the ball and the top 60 of the cage. This reduces the increased force applied to the ball due to the opening of the valve or unseating of the ball because this spring 84 has a substantially smaller spring rate and total force than the substantially larger spring 80 biasing the diaphragm.

This spring 84 also insures that when the valve is closed initial movement radially, axially and pivotally of the diaphragm and cage will not unseat the ball and at most will merely rotate it so that the disc is parallel to and bears on the retainer ring when the ball is initially lifted from the valve seat. This spring 84 also insures that when the valve is open the ball 44 and disc 78 will be in a stable position with the lower face of the disc bearing on the retainer ring 72, the initial closing of the valve will be stable because the ball will seat or close when it first contacts the seat 46 even though the diaphragm and cage may continue to move, axially, radially and orbitally thereafter, and repeated opening and closing of the valve will be stable and repeatable.

In accordance with this invention to provide improved pressure regulation and responsiveness, preferably, but not necessarily, when the valve is opened the increased force acting on the ball 44 due to axial displacement of the diaphragm spring 80 by the fuel to lift the ball off the seat is at least partially offset or balanced by an opposing force acting on the ball and produced by a restricted orifice 86 disposed in the outlet. To create this counter force, the minimum cross sectional area of the orifice or venturi 86 is substantially smaller than the cross section area of the valve seat 46 or opening through which fuel flows. For any specific regulator construction, the desired minimum cross sectional area of the orifice can be calculated and is in part a function of the spring rate of the diaphragm spring 80 and the axial extent to which the ball is displaced from its seat when the valve is opened sufficiently to accommodate the maximum flow rate of the fuel. This area can also be determined impirically. Typically, the minimum cross sectional area of the throat of the venturi 86 is about 1/10 to $\frac{1}{2}$ and usually 1/5 to 4/10 of the cross sectional area of the valve seat 46.

Depending on the particular engine fuel injection and control system with which the regulator is used, the fluid chamber 24 communicates through the tube 26 with one of the atmosphere to compensate for varying atmospheric conditions under which the engine operates, the combustion air intake manifold to provide a substantially constant differential fuel pressure for supplying liquid fuel to fuel injectors or the like, or to a source of compressed air or other gas to vary and control the pressure under which liquid fuel is supplied to the fuel injectors in response to varying engine demand, load and other operating conditions.

In some fuel systems, conditions may occur where the gas pressure in the fluid chamber 24 exceeds the pressure of the fuel or fluid in the fuel chamber 22 sufficiently that after the valve 12 closes, the bellows 38 or pleated area of the diaphragm 14 is forced toward the fuel chamber and tries to invert and collapse into the fuel chamber. For example, in some fuel systems under some conditions the pressure applied to the fluid chamber 24 it could be 80 psig and the pressure in the fuel chamber 22 could be reduced to atmospheric pressure. In accordance with this invention, preferably, but not necessarily, this inversion of the bellows 38 or pleated area of the diaphragm is prevented by the location and contour of an annular wall portion 88 of the body which limits the extent to which the pleated portion of the diaphragm can be displaced toward the fuel chamber to prevent inversion of the pleated portion. This wall portion 88 generally underlies the bellows 38 and in normal operation is spaced from the bellows. However, if the differential pressure acting on the disphragm forces the bellows generally axially toward the seat, the bellows bears on the wall portion 88 which thereby limits its axial movement to prevent inversion of the bellows. If the pleated portion 38 were repeatedly inverted and forced into the fuel chamber, the diaphragm could be damaged which would substantially shorten its useful life.

Figure 2:
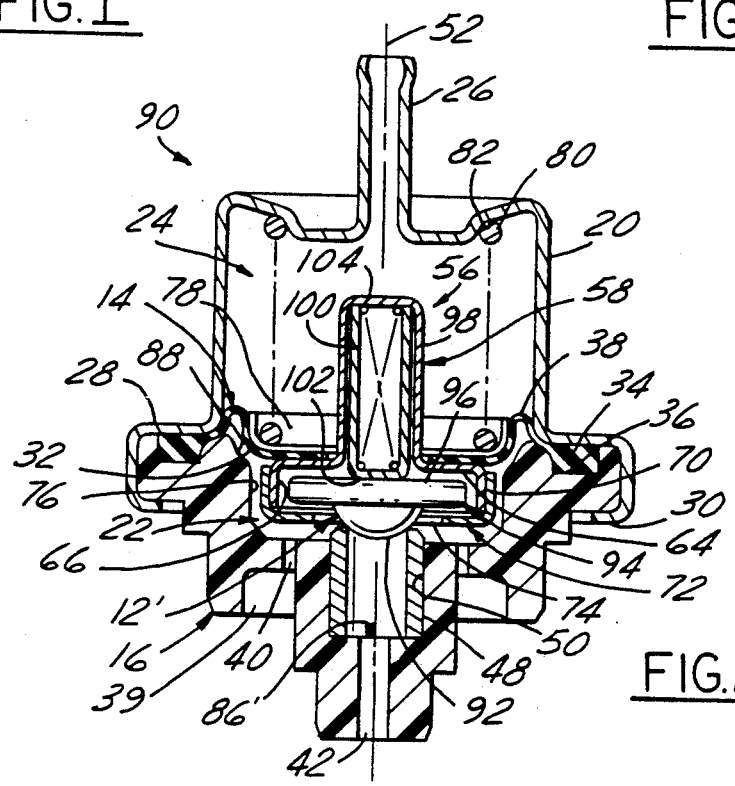
FIG. 2 is a full sectional view of a modified form of the regulator of FIG. 1.

FIG. 2 illustrates a modified fuel regulator 90 in which all of the components identical to those of the fuel regulator of FIGS. 1 and 1A have the same reference numerals. This regulator 90 has a modified valve assembly 12' in which a semi-spherical ball 92 is fixed to one side of a disc 94 received in the cage 56. Both faces of the disc are substantially flat or planar and parallel to each other. The cage has a modified housing 58 with a smaller diameter tubular wall 98 in which a tube shaped plunger 100 with a flat closed end is slidably received with its closed end yieldably biased into engagement with the upper flat face 96 of the disc by a compression spring 104 received in the plunger.

In accordance with another feature of this invention, preferably the generally axial movement of the ball and disc in the cage is dampened by the spring 104 and plunger 100 assembly. In use, with liquid fuel in the plunger from the chamber 22, the plunger 100 acts as a hydraulic damper of the generally axial movement of the ball and disc in the cage due to a relatively close sliding fit of the plunger in the crown 98 of the cage. If desired, the plunger and hydraulic damper arrangement can also be used with the spherical check ball 44 and disc 54 of the regulator of FIG. 1.

In use, this plunger 102 and spring 104 arrangement allows the diaphragm and cage 56 to move radially and pivotally relative to the ball 92 and disc 94 similar to that of the regulator of FIG. 1. This spring and plunger arrangement increases the tendency, when the valve is closed, of the ball and disc to pivot or rock on the seat in unison with the pivotal, oribital or skewing movement of the diaphragm and cage.

Typically, the regulators 10 and 90 are installed in the fuel system for an engine by inserting the free end of the body 16 into a coupler (not shown). The coupler connects the outlet of a fuel pump to the regulator fuel inlet 39, and the regulator outlet 42 of fuel at a regulated pressure to a fuel distribution system of the engine such as a fuel distribution rail for a plurality of fuel injectors. Depending on the nature to the control system, the tube 26 communicating with the fluid chamber 24 is connected to communicate with one of the atmosphere, the combustion air intake manifold or a source of compressed air.

In use, prior to energizing the fuel pump preparatory to starting the engine, the valve assembly 12 or 12' of the regulator 10 or 90 is normally closed, by the force produced by the diaphragm spring 80. When the pressure of the fuel supplied to the chamber rises sufficiently, the diaphragm 14 begins to move away from the valve seat 46 while the ball 44 or 92 remains on the valve seat due to the force acting on it produced by the ball spring 84 or 104. As the fuel pressure continues to increase and the diaphragm continues to move away from the seat, the retainer ring 72 contacts the lower face of the disc 78 or 94 and, unless the disc is already parallel to the plane of the retainer ring, continued movement of the diaphragm and cage rotates the disc while the ball remains on the seat 46 so that the disc is parallel to and engaged by the ring 72 substantially throughout its circumference, whereupon continued movement of the diaphragm and cage lifts the ball off the seat. Upon lift off of the ball, the fuel flows between the seat and the ball and through the outlet 42 at a regulated and essentially constant pressure. The restricted orifice 86 minimizes the pressure drop resulting from the flow of fuel through the outlet 42 and creates a force acting on the ball 44 or 92 which opposes the increase in the force acting on the ball produced by the diaphragm spring 80 as the ball moves farther away from the seat as the rate of flow of fuel to the outlet increases.

As shown by comparison of FIGS. 1 and 1A, it has been discovered that when the diaphragm is moved by the pressurized fuel in the chamber 22, it does not have a uniform motion or a repeatable pattern of motion from one opening of the valve to the next. Furthermore, in mass produced regulators, the motion of the diaphragm for opening the valve varies from one regulator to another having the same design, construction, arrangement and nominal size. The lateral or radial shifting, and the skewing, rocking, pivoting, orbital and other non-axial movement of the diaphragm in regulators embodying this invention does not adversely affect the opening and closing of the valve assembly 12 or 12' or the responsiveness of the pressure regulator. This is achieved by the lost motion construction and arrangement of the cage, ball and disc which operably connects the diaphragm to the ball for opening and closing the valve while still allowing the diaphragm to shift within predetermined limits radially, axially, pivotally and orbitally with respect to the ball when received on the seat.

Figure 3:
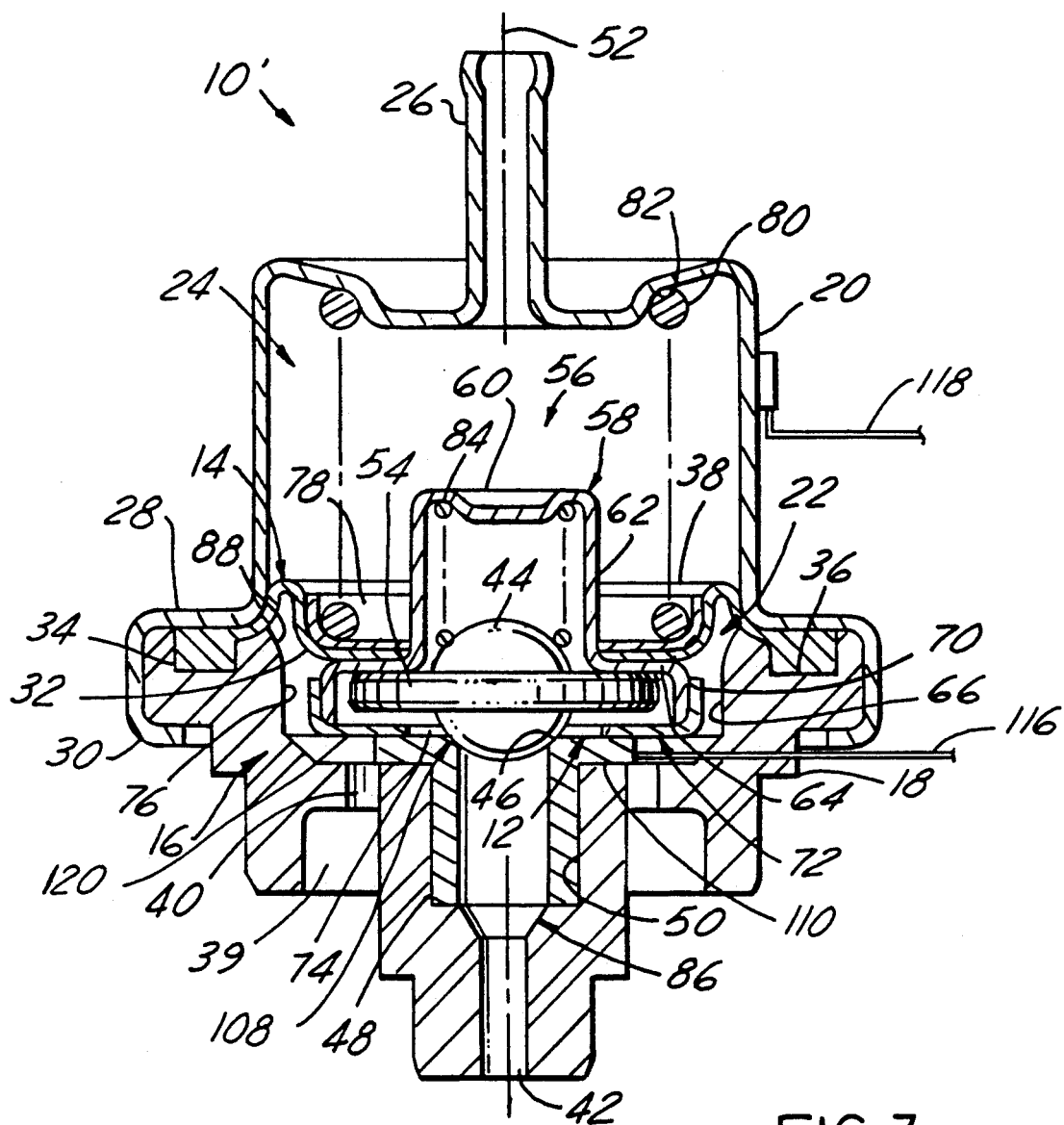
FIG. 3 is a sectional view of a modified fuel prssure regulator embodying this invention with the ball of its control valve shown in its seated or fully closed position, and an electric switch shown in its closed or conductive position.

FIG. 3 illustrates a pressure regulator 10' embodying this invention with an electric switch 108 actuated by opening and closing of the valve 12 to provide a signal for controlling operation of a fuel pump. Switch 108 has a lower switch contact provided by the seat 46 of the sleeve 48' and an upper switch contact provided by the ball 44.

Preferably, the sleeve 48' has an annular flange 110 extending radially from the upper end of the sleeve and is of an electrically conductive material such as brass or steel. Preferably, the outer diameter of flange 110 is sufficiently large so that even if upturned edge 70 of ring 72 bears against side wall 76, the ring will still bear on the flange around their entire circumference when the cage is fully extended by the spring 80. An electrical lead wire 116 is connected to the flange 110 and hence to the lower switch contact provided by the seat 46. The upper switch contact provided by the ball 44 is electrically connected to a lead wire 118 through cap 20, spring 80, retainer ring 78, housing 58, spring 84, and the ball 44 all of which are of an electrically conductive material such as steel.

Figure 4:
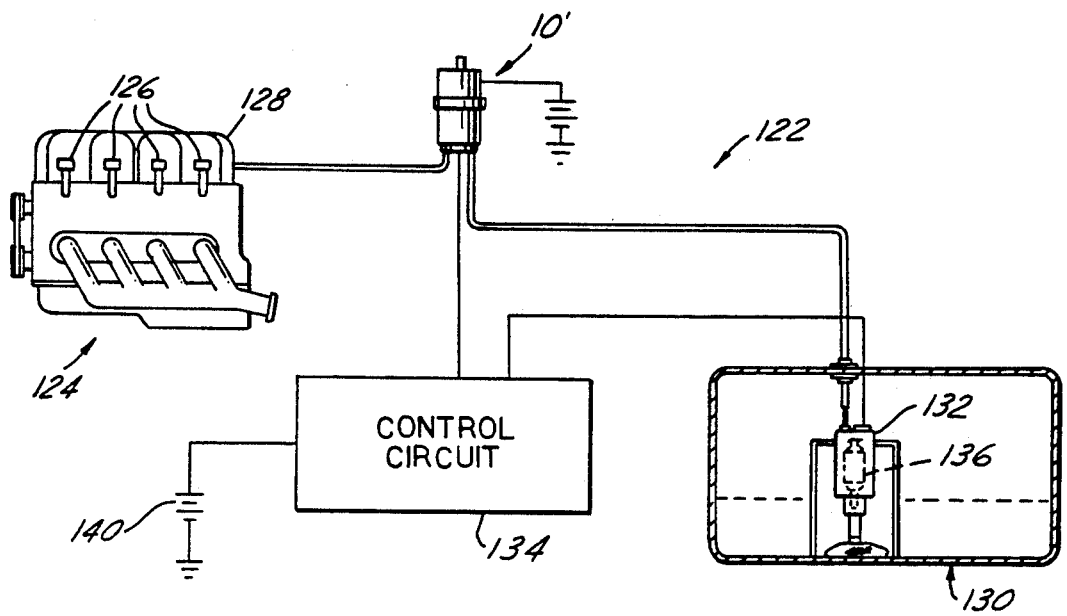
FIG. 4 is a semi-schematic showing of the regulator of FIG. 3 in a fuel supply and control system for a fuel injected internal combustion engine.

FIG. 4 illustrates a fuel delivery system 122 incorporating the pressure regulator 10' for an internal combustion engine 124. The fuel delivery system has fuel injectors 126, connected to a fuel injector rail 128, a fuel tank 130, an electric fuel pump 132 (preferably within the tank), and a circuit 134 to control the speed of an electric motor 136 of the fuel pump and hence its rate of output of fuel.

Figure 5:
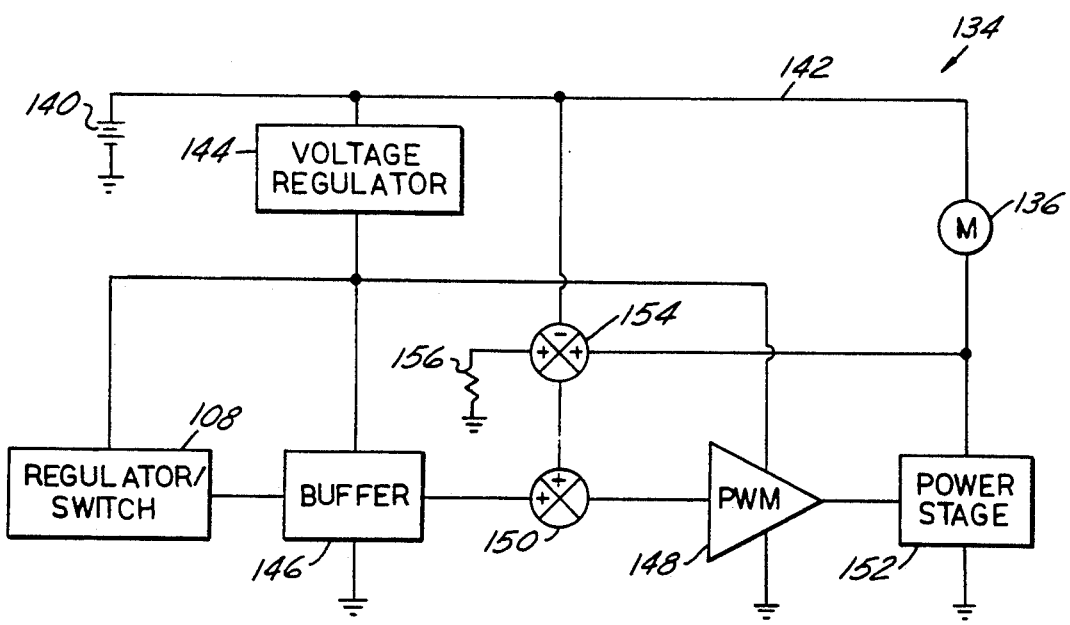
FIG. 5 is a functional block diagram of the pump control electronics of FIG. 4.

The pump control electronics 134 is illustrated in greater detail in FIG. 5. The vehicle power system, illustrated by battery 140, provides power to a system voltage bus 142 that is connected to the pump motor 136. A voltage regulator 144 supplies a regulated voltage from bus 142 to switch 108 of regulator 10', to a buffer 146 and to a pulse width modulation (PWM) amplifier 148. The contacts of regulator/switch 108 provide a signal input to buffer 146, which has a high impedance input to reduce arcing and current draw through the switch contacts. The output of buffer 146 is connected to one input of a summing junction 150, which provides a control input to PWM amplifier 148. The output of PWM amplifier 148 is connected to a power switch stage 152 that controls current through motor 136. The junction of motor 136 and stage 152 is connected as one input to a second summing junction 154, which also receives an input from system bus 142 and a reference voltage third input from a resistor 156 or the like. The output of junction 154 provides the second input to junction 150.

In operation, control circuit 134 illustrated in FIG. 5 operates in the same manner as that disclosed in the above-noted U.S. application Ser. No. 07/949,974, the disclosure of which is incorporated herein by reference. That is, regulator/switch 108 is responsive to pump outlet pressure for switching between conductive and non-conductive conditions at the preselected pump outlet pressure determined by the regulator spring and diaphragm. Pulse width modulation amplifier 148 is controlled by regulator/switch 108 for applying pulsed d.c. energy to pump motor 136 at a first average voltatge level when the pressure switch is conductive, and at a second lesser average voltage level when the pressure switch is non-conductive. In this way, electrical power is applied to the pump motor at a reduced but non-zero level when pump outlet pressure exceeds the threshold level of the regulator/switch. The second lesser average voltage level is proportional to the reference voltage determined by resistor 156. The pulse width modulation amplifier is also controlled in part by system voltage, so that pump motor activation remains substantially constant independent of minor voltage fluctuations.

In the preferred embodiment of the present invention, the frequency of the pulsed d.c. energy applied to pump motor 136 remains constant, while the duty cycle switches between a first duty cycle when pump outlet pressure is below the regulator/switch threshold and a second lesser but non-zero duty cycle when pump outlet pressure is above the regulator/switch threshold. The modulation frequency and the two duty cycles are preset in the design of PWM amplfier 148, although the same may be made adjustable if desired. In this way, electrical energy applied to the pump is automatically reduced when outlet fuel pressure becomes excessive, reducing wear on the pump and heat dissipation by the pump..However, the pump continues to operate at the lesser level, eliminating potential inertial problems when higher pump output is required. The high input impedance of buffer 146 limits current conducted through the contacts of regulator/switch 108 as previously indicated, thereby reducing pitting and arcing at the switch contacts.

Since switch 108 opens and closes in unison with the regulator valve 12, it tends to counteract or reduce the tendency of the fuel pump to overshoot and undershoot the regulated fuel pressure of the output of the regulator. The regulator 10' functions in essentially the same manner as regulator 10 to regulate and control the pressure of the fuel discharged from the regulator.

Pressure regulators embodying this invention have substantially improved responsiveness to rapid changes in the rate of flow of fuel discharged from the regulator and substantially improved regulation of the pressure of the fuel discharged from the regulator. For example, for regulators embodying this invention with a constant outlet fuel pressure with a nominal value of 40 pounds per square inch gauge, the actual pressure variation or drop is only about 0.5 to 0.6 psi over the full range of variation of the fuel flow rate from zero to 30 gallons per hour. This regulator was constructed in accordance with the disclosure of FIG. 1 with nominal dimensions of the ball diameter of 0.281", disc diameter of 0.542"and thickness of 0.060", the annular pocket of the cage in which the disc is received having an inside diameter of 0.602" and an axial height of 0.100", the diaphragm compression spring producing a nominal force of 19 pounds when the valve is closed and having a spring rate of 22.3 pounds per inch, the ball spring producing a nominal force when the valve is closed and the cage bears on the disc as shown in FIG. 1 of 1.99 pounds and having a spring rate of 5.3 pounds per inch, the valve seat having a cross sectional area of 0.03167 of square inch, and the venturi having a throat with a minimun cross sectional area of 0.00418 of a square inch.

What is claimed:

1. A fuel pressure regulator comprising: a housing, a diaphragm defining in cooperation with the housing a first chamber and a second chamber, a passage from the second chamber to the exterior of the housing, a fuel inlet to the first chamber, a fuel outlet from the first chamber, a valve seat associated with said fuel outlet and having a generally circular seat surface for engagement with a complementary valve element, a first spring in said second chamber and urging said diaphragm generally axially toward said valve seat, a cage carried by said diaphragm, a valve element having an exterior surface portion complementary to and for mating sealing engagement with said circular valve seat, said valve element being carried by said cage and movable generally axially by said diaphragm to a closed position received on said valve seat and to an open position spaced from said valve seat, an electrical switch having a first contact of an electrically conductive material fixedly disposed within said first chamber, a second contact of an electrically conductive material and movable with said diaphragm and said cage so that when said valve is closed said first and second contacts are in a conductive state, and when said valve is open said contacts are in a non-conductive state, and pulse width modulation means coupled to said switch for applying pulsed d.c. energy to an electric motor of a fuel pump at a first frequency and duty cycle when said switch is in said conductive state, and at a second non-zero frequency and/or non-zero duty cycle less than said first frequency and/or duty cycle when said switch is in said non-conductive state, such that electrical power applied to the pump motor is reduced when pump outlet pressure applied to said regulator opens said switch.

2. The pressure regulator set forth in claim 1 wherein said first and second frequencies and duty cycles are preset in said pulse width modulation means.

3. The pressure regulator set forth in claim 2 wherein said first and second frequencies are identical.

4. The pressure regulator set forth in claim 2 wherein said pulse width modulation means further includes means connected to said switch for limiting current conducted by said switch in said conductive state of said switch.

5. A fuel pressure regulator comprising: a housing, a diaphragm defining in cooperation with the housing a first chamber and a second chamber, a passage from the second chamber to the exterior of the housing, a fuel inlet to the first chamber, a fuel outlet from the first chamber, a valve seat associated with said fuel outlet and having a generally circular seat surface for engagement with a complementary valve element, a first spring in said second chamber and urging said diaphragm generally axially toward said valve seat, a cage carried by said diaphragm, a valve element having an exterior portion with a generally spherical surface portion complementary to and for mating sealing engagement with said circular valve seat, said valve element being carried by said cage and movable generally axially by said diaphragm to a closed position received on said valve seat and to an open position spaced from said valve seat, a second spring carried by said cage and yieldably urging said valve element generally axially toward said valve seat relative to said cage, a carrier element carried by said valve element for movement in unison therewith and projecting generally radially of the longitudinal axis of said valve element, said valve element comprises a ball, said carrier element comprises a disc encircling the mid portion of said ball, projecting generally radially outward thereof and fixed to said ball for movement in unison therewith, said cage having a cavity in which said carrier element is received, said cavity and said carrier element being dimensioned and constructed and arranged to provide a lost motion coupling between said diaphragm and said valve element so that with said valve element on said valve seat said diaphragm can move generally axially, rdially and pivotally within predetermined limits relative to said valve element without moving it from said valve seat and thereafter upon further generally axial movement of said diaphragm away from said valve seat said valve element will be moved from its closed position toward its fully open position, and an electrical switch having a first contact of an electrically conductive material fixedly disposed within said first chamber, a second contact of an electrically conductive material and movable with said diaphragm and said cage so that when said valve is closed said first and second contacts are in a conductive state, and pulse width modulation means coupled to said switch for applying pulsed d.c. energy to an electric motor of a fuel pump at a first frequency and duty cycle when said switch is in said conductive state, and at a second non-zero frequency and/or non-zero duty cycle less than said first frequency and/or duty cycle when said switch is in said non-conductive state, such that electrical power applied to the pump motor is reduced when pump outlet pressure applied to said regulator opens said switch.

6. The pressure regulator set forth in claim 5 wherein said first and second frequencies and duty cycles are preset in said pulse width modulation means.

7. The pressure regulator set forth in claim 6 wherein said first and second frequencies are identical.

8. The pressure regulator set forth in claim 6 wherein said plulse width modulation means further includes means connected to said switch for limiting current conducted by said switch in said conductive state of said switch.

9. The pressure regulator of claim 5 wherein said first contact is the top surface of an integral circumferential annular flange extending radially outward from said valve seat.

10. The pressure regulator of claim 5 wherein said second contact is the bottom surface of said cage.

11. The pressure regulator of claim 5 wherein said carrier member comprises a disc fixed to said valve element for movement in unison therewith and having a maximum outside diameter which is smaller than the inside diameter of said cavity, and a generally axial thickness which is less than the generally axial extent of said cavity adjacent the perimeter of said disc.

12. The pressure regulator of claim 5 wherein said disc has a pair of generally planar faces which are spaced apart and parallel to each other, and said cavity has a pair generally planar faces which are generally axially spaced apart and parallel to each other and overlap the periphery of said disc which is received between said planar faces of said cavity of said cage.

13. The pressure regulator of claim 5 which also comprises a restricted orifice disposed in said fuel outlet downstream of said valve seat and having a minimum cross sectional area in the range of 1/10 to ½ of the cross sectional area of said valve seat.

14. The pressure regulator of claim 5 wherein said flexible diaphragm has at least one circumferentially continuous pleat therein.

15. The pressure regulator of claim 5 wherein said flexible diaphragm has at least one circumferentially continuous pleat therein circling and disposed generally radially outwardly of said cage and said housing has in said second chamber a circumferentially continuous wall portion generally axially aligned with and normally spaced from said pleat in said diaphragm and constructed and arranged for said diaphragm to bear on said wall portion to prevent inversion of said pleat when the pressure of fluid in said second chamber and acting on said diaphragm exceeds the pressure of any fluid in said first chamber acting on said diaphragm.

16. A fuel pressure regulator comprising: a housing, a diaphragm defining in cooperation with the housing a first chamber and a second chamber, a passage from the second chamber to the exterior of the housing, a fuel inlet to the first chamber, a fuel outlet from the first chamber, a valve seat associated with said fuel outlet and having a generally circular seat surface for engagement with a complementary valve element, a first spring in said second chamber and urging said diaphragm generally axially toward said valve seat, a cage carried by said diaphragm, a valve element having an exterior portion with a generally spherical surface complementary to and for mating sealing engagement with said circular valve seat, said valve element being carried by said cage and movable generally axially by said diaphragm to a closed position received on said valve seat and to an open position spaced from said valve seat, a second spring carried by said cage and yieldably urging said valve element generally axially toward said valve seat relative to said cage, a carrier element carried by said valve element for movement in unison therewith and projecting generally radially of the longitudinal axis of said valve element, said valve element comprises a semi-spherical body, said carrier element comprises a disc fixed to said semi-spherical body and projecting generally radially outwardly thereof for movement in unison therewith, said cage having a cavity in which said carrier element is received, said cavity and said carrier element being dimensioned and constructed and arranged to provide a lost motion coupling between said diaphragm and said valve element so that with said valve element on said valve seat said diaphragm can move generally axially, radially and pivotally within predetermined limits relative to said valve element without moving it from said valve seat and thereafter upon further generally axial movement of said diaphragm away from said valve seat said valve element will be moved from its closed position toward its fully open position, said cage has a pocket therein communicating with said first chamber to receive therein liquid fuel from said first chamber, and a plunger slidably received in said pocket, bearing on said valve element and constructed and arranged to provide a hydraulic damper of generally axial movement of said valve element relative to said cage, said plunger is constructed and arranged so that said plunger can move generally radially and pivotally relative to said carrier element, an electrical switch having a first contact of an electrically conductive material fixedly disposed within said first chamber, a second contact of an electrically conductive material and movable with said diaphragm and said cage so that when said valve is closed said first and second contacts are in a conductive state when said valve is open said contacts are a non-conductive state, and pulse width modulation means coupled to said switch for applying pulsed d.c. energy to an electric motor of a fuel pump at a first frequency and duty cycle when said switch is in said conductive state, and at a second non-zero frequency and/or non-zero duty cycle less than said first frequency and/or duty cycle when said switch is in said non-conductive state, such that electrical power applied to the pump motor is reduced when pump outlet pressure applied to said regulator opens said switch.

17. The pressure regulator set forth in claim 16 wherein said first and second frequencies and duty cycles are preset in said pulse width modulation means.

18. The pressure regulator set forth in claim 17 wherein said first and second frequencies are identical.

19. The pressure regulator set forth in claim 17 wherein said pulse width modulation means further includes means connected to said switch for limiting current conducted by said switch in said conductive state of said switch.

20. The pressure regulator of claim 16 wherein said second spring is disposed in said pocket and yieldably urges said plunger generally axially toward said valve element and said valve element toward said seat relative to said cage.

21. The pressure regulator of claim 20 wherein said first spring produces a force acting on said diaphragm having a greater magnitude than the force produced by said second spring acting on said valve element, and said first spring has a higher spring rate than the spring rate of said second spring.

22. The pressure regulator of claim 5 wherein said first spring produces a force acting on said diaphragm having a greater magnitude than the force produced by said second spring acting on said valve element, and said first spring has a higher spring rate than the spring rate of said second spring.

23. The pressure regulator of claim 16 whrein said first contact is the top surface of an integral circumferential annular flange extending radially outward from said valve seat.

24. The pressure regulator of claim 16 wherein said second contact is the bottom surface of said cage.

* * * * *